(12) United States Patent
Yusa

(10) Patent No.: US 6,674,832 B2
(45) Date of Patent: Jan. 6, 2004

(54) PEDOMETER WITH AN ILLUMINATION LAMP

(75) Inventor: Toshikazu Yusa, Sumida-ku (JP)

(73) Assignee: Tokyo Compass Mfg. Co., Ltd., Tokyo (JP)

(*) Notice: Subject to any disclaimer, the term of this patent is extended or adjusted under 35 U.S.C. 154(b) by 0 days.

(21) Appl. No.: 10/206,527

(22) Filed: Jul. 26, 2002

(65) Prior Publication Data

US 2003/0021372 A1 Jan. 30, 2003

(51) Int. Cl.⁷ .............................................. G01C 21/00
(52) U.S. Cl. ...................... 377/24.2; 362/23; 362/157; 362/205; 362/253; 362/362; 362/363
(58) Field of Search ..................... 377/24.2; 362/28, 362/29, 30, 31, 104, 577, 581, 362, 363, 157, 205, 253, 23

(56) References Cited

U.S. PATENT DOCUMENTS 5,556,003 A * 9/1996 Johnson et al. .............. 222/39
5,746,501 A * 5/1998 Chien ......................... 362/103

* cited by examiner

*Primary Examiner*—Margaret R. Wambach
(74) *Attorney, Agent, or Firm*—Koda & Androlia

(57) ABSTRACT

A pedometer including a pedometer body having a measuring mechanism that makes a measurement of a number of steps walked and a display that shows the measurement result; an illumination lamp and a battery installed in the pedometer body; a window provided in the pedometer body so as to allow the light of the illumination lamp to illuminate the outside of the pedometer body; and a power switch provided on the pedometer body and operable from the outside so as to turn on and off the illumination lamp.

7 Claims, 3 Drawing Sheets

PEDOMETER WITH AN ILLUMINATION LAMP

BACKGROUND OF THE INVENTION

1. Field of the Invention

The invention relates to a pedometer and more particularly to a pedometer equipped with an illumination lamp.

2. Prior Art

It has become commonplace to carry a flashlight when engaging in outdoor activities. One should carry an illuminating device such as a flashlight just in case, even if one plans to return before sunset. However, conventional illuminating devices such as flashlights are surprisingly heavy and therefore difficult to walk around with. For this reason, not a few people have failed to bring along a flashlight only to return late and worry about an impending sunset.

Persons who enjoy walking sometimes carry around large flashlights in the dark, but such large-sized flashlights are obstructive and not suitable for walking.

SUMMARY OF THE INVENTION

Accordingly, it is an object of the invention to provide a new pedometer that overcomes the problems above.

It is another object of the present invention to provide a light, convenient pedometer that incorporates an illumination lamp in order to provide a sense of comfort by offering illumination that can be utilized as auxiliary illumination in the off chance of a late return time as well as allow an enjoyable sense of comfort and safety for walking at night or in the dark.

The above object is accomplished by a unique structure for a pedometer that is comprised of: a pedometer body including therein a measuring mechanism that makes a measurement of a number of steps walked and a display that displays the result of the measurement; an illumination lamp installed in the pedometer body; a battery installed in the pedometer body; a first window provided in the pedometer body so as to allow the light of the illumination lamp to illuminate the outside of the pedometer body; and a power switch provided on the pedometer body and operable from the outside of the pedometer body so as to turn on and off the illumination lamp.

The pedometer of the present invention offers operation that allows use as a conventional pedometer and also offers operation that allows use as a spotlight when the pedometer body is held in hand and the power switch is turned on.

The above object is accomplished by another unique structure for a pedometer that is comprised of: a pedometer body including therein a measuring mechanism that makes a measurement of a number of steps walked and a display that displays the result of the measurement, the pedometer body being comprised of a main body unit and a lid member that is hingedly connected to the main body unit so as to open and close and covers the display when closed; an illumination lamp and a battery installed in the lid member; a first window provided in the lid member so as to allow the light of the illumination lamp to illuminate the outside of the pedometer body; and a power switch provided on the pedometer body and operable from the outside of the pedometer body so as to turn on and off the illumination lamp.

In this structure, since the illumination lamp and the battery are housed in the lid member, the lighting mechanism can be easily co-installed with the measuring mechanism that makes a measurement of a number of steps walked without causing any influence to such a measuring mechanism.

The above object is accomplished by a still another unique structure for a pedometer that is comprised of: a pedometer body including therein a measuring mechanism that makes a measurement of a number of steps walked and a display that displays the result of the measurement, the pedometer body being comprised of a main body unit and a lid member that is hingedly connected to the main body unit so as to open and close and covers the display when closed; an illumination lamp and a battery installed in the lid member; a first window provided in the lid member so as to allow the light of the illumination lamp to illuminate the outside of the pedometer body; a second window provided in an illumination unit disposed in the lid member so that the illumination lamp illuminates the outside of the pedometer body as well as the display when the lid member is half opened; and a power switch provided on the pedometer body and operable from an outside of the pedometer body so as to turn on and off the illumination lamp.

In this pedometer, the pedometer functions to illuminate the display of the pedometer in the dark in addition to an operation as an illumination lamp.

The above object is accomplished by a further unique structure for a pedometer that is comprised of: a pedometer body including therein a measuring mechanism that makes a measurement of a number of steps walked and a display that displays the result of the measurement, the pedometer body being comprised of a main body unit and a lid member that is hingedly connected to the main body unit so as to open and close and covers the display when closed, the lid member being formed from a box-like lid member main body and an illumination unit that is removable from the box-like lid member main body; an illumination lamp and a battery installed in the lid member, the battery being solely for the illumination lamp; a first window provided in the lid member so as to allow the light of the illumination lamp to illuminate the outside of the pedometer body; a second window provided in the illumination unit so that the illumination lamp illuminates the outside of the pedometer body as well as the display while the lid member is half opened; and a power switch provided on the pedometer body and operable from the outside of the pedometer body so as to turn on and off the illumination lamp.

Since the battery specifically used for the illumination lamp is installed in the lid member, the illumination lamp operates without affecting the function of the measuring mechanism and can be used as an illuminator. In addition, since the lid member is formed from the lid member main body and an illumination unit that is removable from the lid member main body for its entirety or only a part thereof that is for the replacement of the battery, the battery can be easily replaced with a new battery.

DETAILED DESCRIPTION OF THE INVENTION

Hereafter, the embodiments of the present invention will be described with reference to the accompanying drawings.

Figure 1:
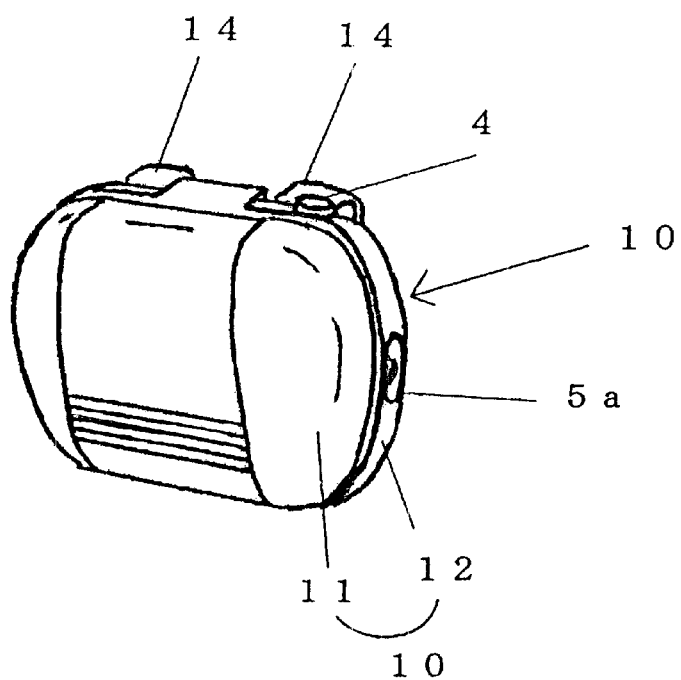
FIG. 1 is an external view of one embodiment of the pedometer according to the present invention.
Figure 2:
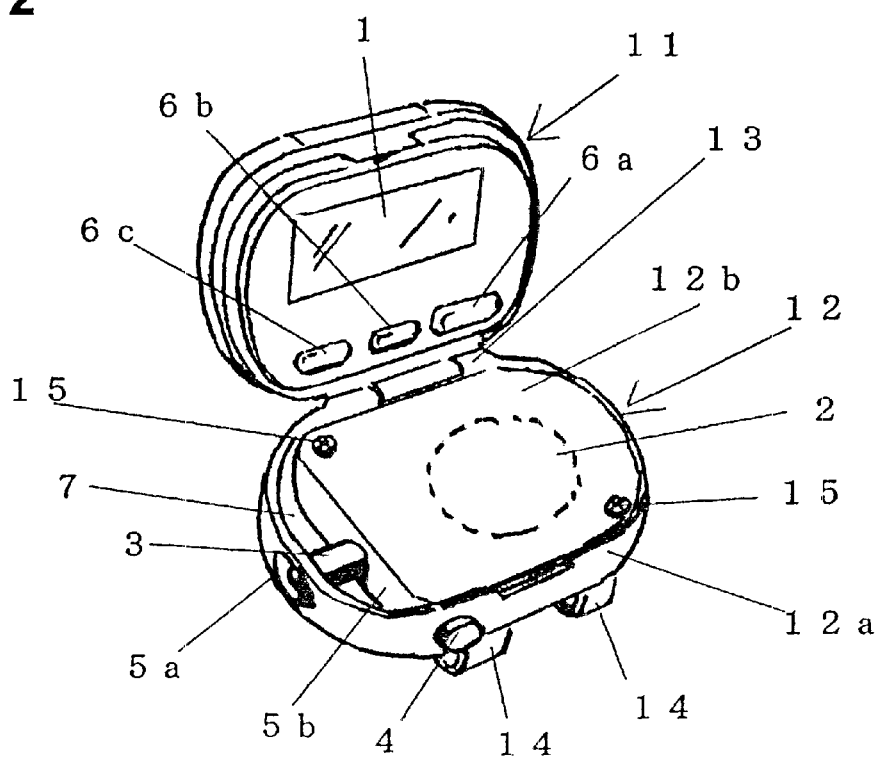
FIG. 2 is an external view thereof with the lid member half opened.

In FIGS. 1 and 2, the reference numeral 10 is a pedometer body. The pedometer body 10 is substantially identical to those already generally in use; and, though not shown, it houses a known measuring mechanism (not shown) that measures the number of steps walked. The pedometer body 10 has a display 1 that displays the results of the measuring mechanism. The reference numerals 6a, 6b and 6c are the operational buttons for the measuring mechanism.

A standard LCD (liquid crystal display) is used as the display 1, and a lid member 12 is disposed so as to protect the display 1. In other words, the pedometer body 10 is comprised of a main body unit 11 (that includes the measuring mechanism) and the lid member 12; and the lid member 12 is hingedly connected to the main body unit 11 at a hinge portion 13 so that the lid member 12 is opened and closed relative to the main body unit 11. The entire inner face of the main body unit 11 that has the display 1 is exposed when the lid member 12 is opened as shown in FIG. 2, and it is covered by the lid member 12 when the lid member 12 is closed as shown in FIG. 1. The reference numerals 14 are hooks for putting the pedometer body 10 on a user (or on, for instance, the belt of the user).

An illumination lamp 3 and a battery 2 are provided in the pedometer body 10. A filament light bulb is generally used as the illumination lamp 3, but a recently developed high-intensity LED (light emitting diode) can be used instead. Such a high-intensity LED has a high durability and luminous intensity thus can withstand the actual use.

Figure 6A:
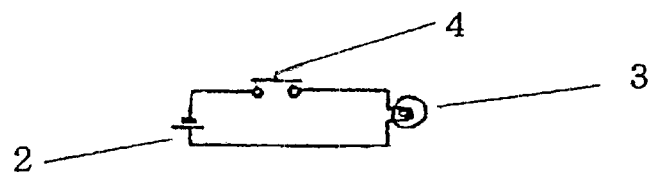
FIG. 6A is a circuit diagram of the illumination lamp which is a filament light bulb.
Figure 6B:
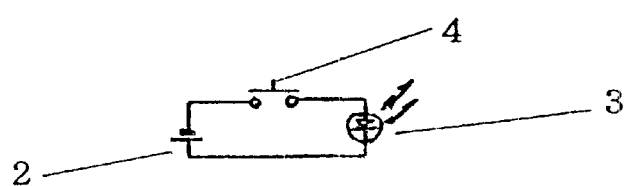
FIG. 6B is a circuit diagram of the illumination lamp which is an LED.

A first window 5a is provided in one end of the pedometer body 10 so that the illumination lamp 3 illuminates the outside of the pedometer body 10. In addition, a power switch 4, operable from the outside of the pedometer body 10, is provided on the pedometer body 10. The power switch 4 opens and closes the connection between the illumination lamp 3 and the battery 2 so as to turn on and off the illumination lamp 3. The power switch 4 can be a sliding or press-button switch button; and as seen from FIGS. 6A and 6B, the illumination lamp 3 and the power switch 4 are connected in series to the battery 2. A part of the illumination lamp 3 protrudes from the first window 5a formed in the pedometer body 10; and the light from the first window 5a, when the illumination lamp 3 is turned on, illuminates the outside of the pedometer body 10.

More specifically, the pedometer body 10, which includes a measuring mechanism for measuring the number of steps walked and the display 1 for displaying the result of the measuring mechanism, is comprised of the main body unit 11 and the lid member 12 that is connected to the main body unit 11 hingedly so as to open and close. The lid member 12, when closed, covers the display 1, and it houses the illumination lamp 3 and the battery 2. The lid member 12 is provided with the first window 5a at one end thereof so that the illumination lamp 3 illuminates the light to the outside of the pedometer body 10. The lid member 12 is provided also with the power switch 4 on the outer surface thereof. The power switch 4 makes the connection between the illumination lamp 3 and the battery 2 so that the illumination lamp 3 is lit when the power switch 4 is turned on.

As seen from the above, the illumination lamp 3 and the battery 2 are housed in the lid member 12, and the first window 5a from which the light of the illumination lamp 3 is illuminated out to the outside of the pedometer body 10 is provided in the lid member 12. Thus, a majority of the instruments utilized for the illuminating function is set in the lid member 12, and the illumination lamp 3 is prevented from affecting the function of the pedometer.

Furthermore, a second window 5b, through which the illumination lamp 3 illuminates the display 1 with its light when the lid member 12 is in a half-open state as shown in FIG. 2, is provided in the illumination unit 12b of the lid member 12. In the shown embodiment, the second window 5b is, as seen from FIG. 5, defined by an open space; however, it can be a through hole or a transparent plate formed in the illumination unit 12b.

Figure 3A:
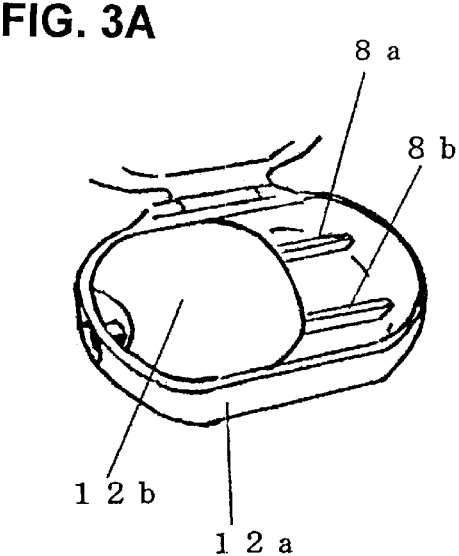
FIGS. 3A and 3B are schematic diagrams of another embodiment of the pedometer according to the present invention.
Figure 3B:
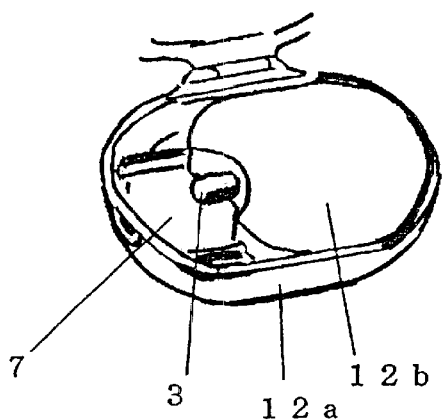
Figure 4:
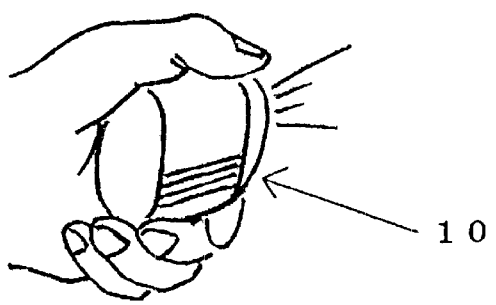
FIG. 4 is a schematic diagram of the pedometer of the present invention in use as an illumination lamp.

FIGS. 3A and 3B illustrate the illumination unit 12b that is formed therein with a pair of guide rails 8a and 8b, and the illumination unit 12b is disposed on the guide rails 8a and 8b in a sliding fashion. With this structure, when the illumination unit 12b is slid to the position shown in FIG. 3B, the light of the illumination lamp 3 actively illuminates the display 1. FIG. 3A shows the illumination unit 12b slid all the way to the first window 5a. The illumination unit 12b is engaged at its bottom with the guide rails 8a and 8b and is thus prevented from falling out of the guide rails 8a and 8b.

The reference numeral 7 in FIG. 3B is a reflecting surface 7. The reflecting surface 7 is formed at an appropriate location on the inner surface of the lid member 12 so as to reflect the light of the illumination lamp 3 toward the display 1, thus effectively illuminating the display 1.

Figure 5:
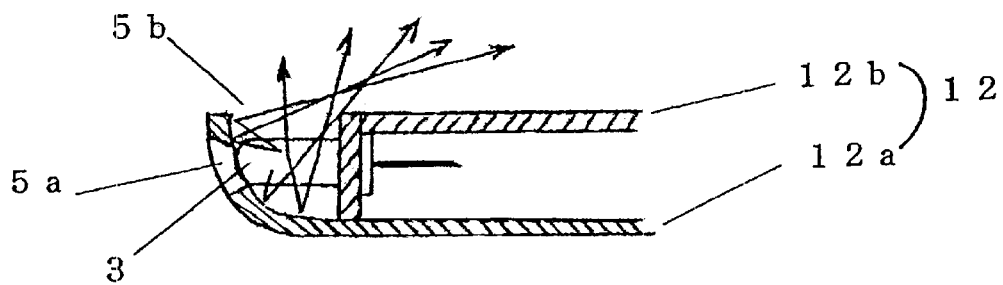
FIG. 5 shows, in cross section, the pathways of light beams of the illumination lamp.

FIG. 5 shows the pathways of the light emitted from the illumination lamp 3 when the illumination lamp 3 is on. As seen from FIG. 5, most of the light emitted from the light source of the illumination lamp 3 proceeds straight out of the pedometer body 10 through the first window 5a. However, a part of the light leaks from the periphery of the illumination lamp 3 and illuminates the display 1, and a part of the light is reflected by the reflecting surface 7 of the lid member 12 and illuminates the display 1. Thus, the display 1 is well observable in the dark by the illuminating light of the lamp 3.

The illumination unit 12b can be provided so that it is fully (including the illumination lamp 3 and the battery 2) removable from the lid member main body 12a. The illumination unit 12b can be provided also so that a part thereof which is for the purpose of battery change is removable from the lid member main body 12a. In other words, since the pedometer 10 houses the battery 2 and the illumination lamp 3 in the lid member 12, the volume space therefor is sufficiently secured, and the battery 2 is easily exchangeable. As shown in FIG. 2, the illumination unit 12b disposed in the lid member 12 can be removed by unscrewing the securing screws 15; and when the internal battery 2 is to be changed, the illumination unit 12b is removed from the pedometer 10. It goes without saying that the illumination unit 12b can be held in the lid member main body 12a in a detachable fashion by, for instance, a latching hook or like means (not shown).

In the shown embodiment, the battery 2 is provided especially for the illumination lamp 3. In other words, when the illumination lamp 3 has a large electric current consumption, it is simpler and more practical to provide a power source in the lid member 12 so that the illumination lamp 3 is independent from and unshared with a power source for the measuring mechanism.

As seen from the above, since the pedometer of the present invention is wearable in an easy manner and is provided with an illumination lamp, it is used as a matter of course as a pedometer and can also be easily used as a spotlight whenever and wherever as long as it is worn or carried in hand.

Moreover, since the pedometer of the present invention is provided with an illumination lamp, when the pedometer is opened and the switch of the illumination lamp is turned on, the light illuminates the display, and the numbers shown on the display can be easily read during the nighttime walk.

What is claimed is:

1. A pedometer comprising:
    a pedometer body including therein a measuring mechanism that make a measurement of a number of steps walked and a display that displays a result of said measurement;
    an illumination lamp installed in said pedometer body;
    a battery installed in said pedometer body;
    a first window provided in said pedometer body so as to allow light of said illumination lamp to illuminate an outside of said pedometer body; and
    a power switch provided on said pedometer body, said power switch being operable from an outside of said pedometer body so as to turn on and off said illumination lamp.

2. The pedometer according to claim 1, wherein said pedometer body is comprised of a main body unit and a lid member that is hingedly connected to said main body unit so as to open and close and covers said display when closed, and said illumination lamp and battery are installed in said lid member.

3. The pedometer according to claim 2, wherein said lid member is provided with an illumination unit that includes said illumination lamp and battery and is formed with a second window so that said illumination lamp illuminates said outside of said pedometer body as well as said display.

4. The pedometer according to claim 1, wherein said pedometer body is comprised of a main body unit and a lid member that is hingedly connected to said main body unit so as to open and close and covers said display when closed, and said lid member is comprised of a box-like lid member main body and an illumination unit that is removably installed in said box-like lid member main body.

5. The pedometer according to claim 4, wherein said illumination unit is removable from said box-like lid member main body for an entirety thereof.

6. The pedometer according to claim 4, wherein a part of said illumination unit is removable from said box-like lid member main body, said part being used for changing said battery.

7. The pedometer according to claim 4, wherein said box-like lid member main body is provided therein with a guide rail and said illumination unit is slidably provided on said guide rail.

* * * * *

UNITED STATES PATENT AND TRADEMARK OFFICE
CERTIFICATE OF CORRECTION

PATENT NO. : 6,674,832 B2
DATED : January 6, 2004
INVENTOR(S) : Toshikazu Yusa

It is certified that error appears in the above-identified patent and that said Letters Patent is hereby corrected as shown below:

<u>Title page,</u>
Item [30], Foreign Application Priority Data, add -- July 26, 2001 (JP) ....... 2001-260473 --

Signed and Sealed this

Twenty-first Day of June, 2005

JON W. DUDAS
*Director of the United States Patent and Trademark Office*